United States Patent [19]

Bunten

[11] 3,740,452

[45] June 19, 1973

[54] PEDESTALS FOR ELECTRICAL CIRCUIT COMPONENTS

[75] Inventor: Theodore M. Bunten, Rydal, Pa.

[73] Assignee: Repco Products Corporation, Philadelphia, Pa.

[22] Filed: Feb. 10, 1972

[21] Appl. No.: 225,069

Related U.S. Application Data

[63] Continuation-in-part of Ser. Nos. 192,253, Oct. 26, 1971, abandoned, and Ser. No. 212,942, Dec. 28, 1971.

[52] U.S. Cl. .................................. 174/38, 174/60
[51] Int. Cl. .............................................. H02g 9/02
[58] Field of Search ................ 174/38, 44, 60, 100, 174/101; 317/120

[56] References Cited
UNITED STATES PATENTS

| | | | |
|---|---|---|---|
| 3,164,668 | 1/1965 | Skubal | 174/38 UX |
| 3,257,496 | 6/1966 | Hamilton | 174/38 |
| 3,404,212 | 10/1968 | Mack et al. | 174/38 |
| 3,538,236 | 11/1970 | Baumgartner | 174/38 |
| 3,604,835 | 9/1971 | Hamilton | 174/38 |

Primary Examiner—Laramie E. Askin
Attorney—Zachary T. Wobensmith, 2nd

[57] ABSTRACT

A hollow vertical pedestal or terminal housing is disclosed having a bottom section for support and cable entrance and with a removable cable guard plate, and an upper section, the upper front portion being readily removable, carried on the main portion of the housing with access upon removal to the interior into which cables and the like to be connected are terminated, the upper section having a vertical interior component mounting plate removably carried on vertical pivots at one side, the mounting plate having locking mechanism holding the plate in one position, permitting in another position partial swinging movement of the mounting plate for access, and in still another position permitting further swinging movement and removal for complete access. The mounting plate has improved provisions for attachment of electrical circuit components including grounding clamps. Alternative mounting plates and brackets are shown. The removability of the cable guard plate and the component mounting plate permits of removal of the pedestal in the event of damage without the necessity for reconnection or replacing of conductors. A protective shield of flexible dielectric material may be provided to enclose the circuit components and provide a dielectric shield, a dust shield and a snow and weather shield.

17 Claims, 8 Drawing Figures

United States Patent [19]
Bunten
[11] 3,740,452
[45] June 19, 1973
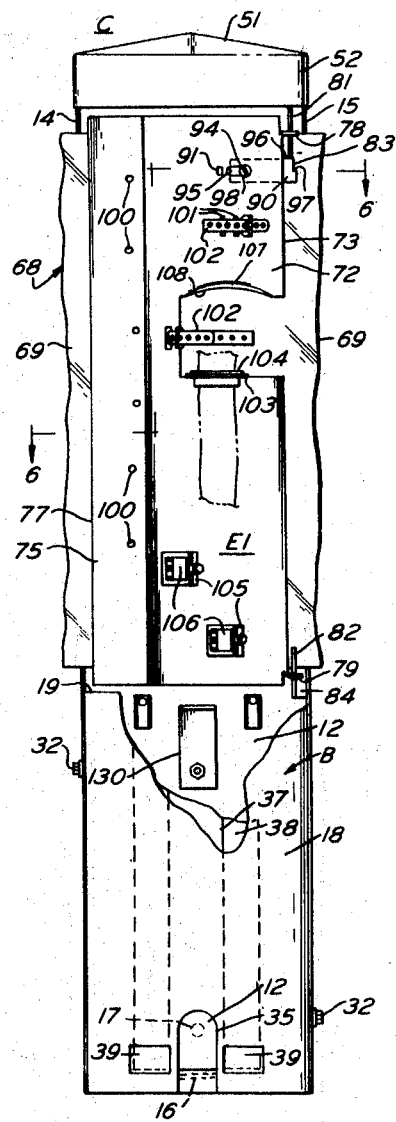

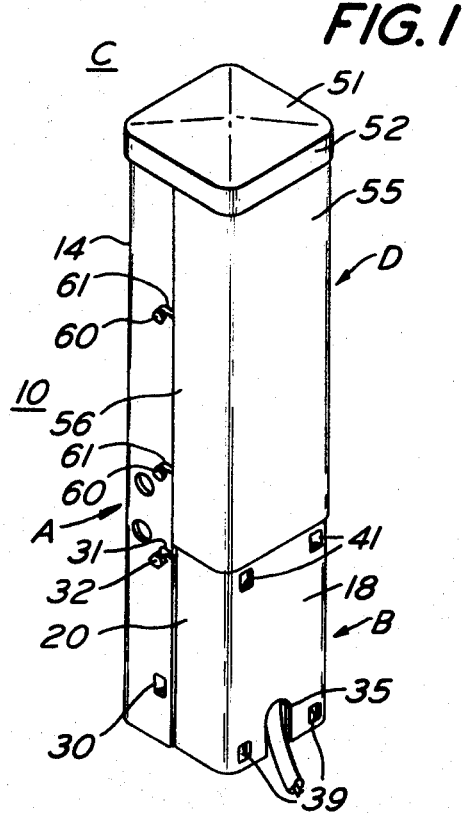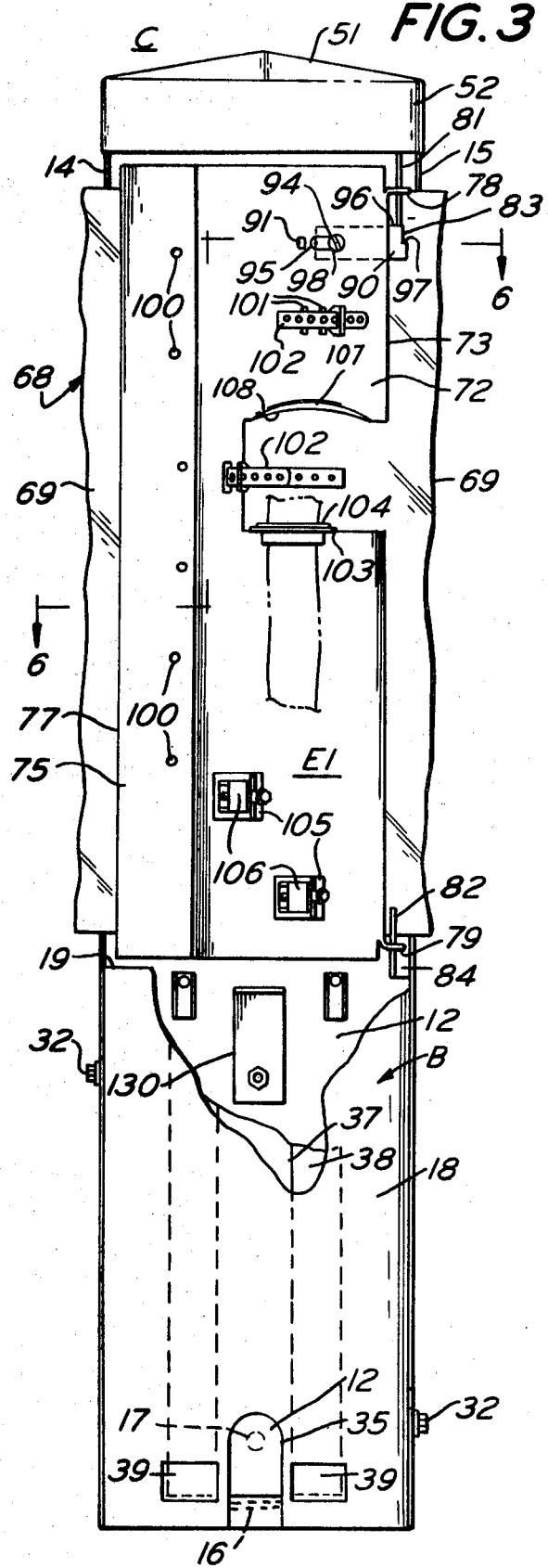

PEDESTALS FOR ELECTRICAL CIRCUIT COMPONENTS

CROSS REFERENCE TO RELATED APPLICATION

This application is a continuation-in-part of my prior applications for Pedestals for Electrical Circuit Components filed Oct. 26, 1971, Ser. No. 192,253 (now abandoned) and filed Dec. 28, 1971, Ser. No. 212,942.

BACKGROUND OF THE INVENTION

1. Field of the Invention

This invention relates to hollow vertical pedestals extending above ground for the connection of cable terminals and the interposition of electrical circuit components and more particularly to provisions for facilitating the connection of the components and their electrical connections.

2. Description of the Prior Art

It has heretofore been proposed to provide pedestals and other receptacles below and above ground for the connection of the terminal ends of meeting cables and electrical conductors. The vertical pedestals heretofore available had their guard plates fixedly carried by the pedestal and interior component mounting plates usually permanently secured and/or difficult of access.

The interior cable guard plates and mounting plates heretofore employed did not permit of easy separation of such plates from the pedestal in the event of damage to the pedestal.

The mounting plates and brackets heretofore available in vertical pedestals did not lend themselves to easy splicing of wires or attachment of components with attendant difficulty of access and consequent time delay in making connections.

SUMMARY OF THE INVENTION

In accordance with the invention a hollow pedestal or terminal housing is provided, preferably of sheet metal, for the connection in the interior of the terminal ends of electrical cables, electrical conductors and the like, with or without interposed electric circuit components, which includes an outer upright lower section which can extend below the surface of the earth with a detachable lower front portion and an integral upper section having a fixed back and forwardly extending side portions and front and top closure portions securely but removably carried on the upper section, the upper section having a vertical interior component mounting plate removably carried on vertical pivots at one side, the mounting plate having locking mechanism holding the plate in one position, permitting swinging movement in another position and permitting removal of the mounting plate from its pivots in still another position.

The arrangement permits of separation of the mounting plate from the upper section of the pedestal without disturbing the electrical connections and this with the separability of the cable guard plate permits of separation of the cable and its connections from the pedestal for replacement of the pedestal if desired or required. Component carrying elements are also provided on the mounting plate which are readily accessible and facilitate the attachment of components and conductors.

It is the principal object of the present invention to provide a hollow pedestal, a part of which is exposed and a part of which can be mounted in the earth, for accommodation of and protection of the ends of underground cables extending thereto, with provisions for easy mounting of electrical circuit components in the interior thereof but permitting separation of the cable and connected components from the pedestal if desired or required.

It is a further object of the present invention to provide a pedestal assembly of the character aforesaid which is self-contained and ready for use.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 1 is a view in perspective of the pedestal in accordance with the invention and as seen from one side;

FIG. 2 is a view similar to FIG. 1 as seen from the other side and showing the upper front section partially removed;

FIG. 3 is a front elevational view on a larger scale with the upper front section removed and with other parts broken away to show details of construction;

Figure 4:
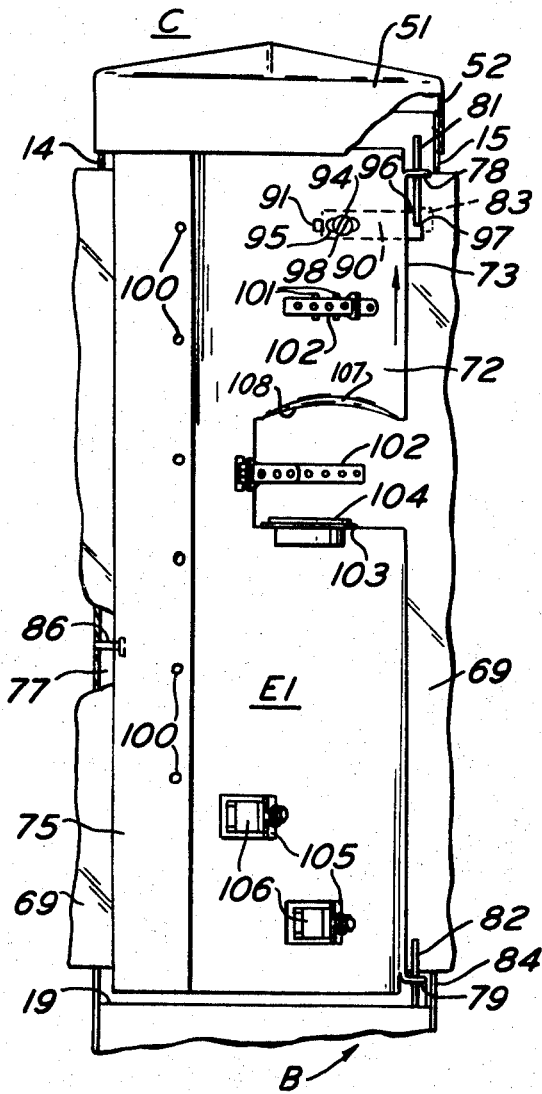
FIG. 4 is a front elevational view of the upper part of the pedestal as shown in FIG. 3 but with the retainer bar in a partially released position.
Figure 5:
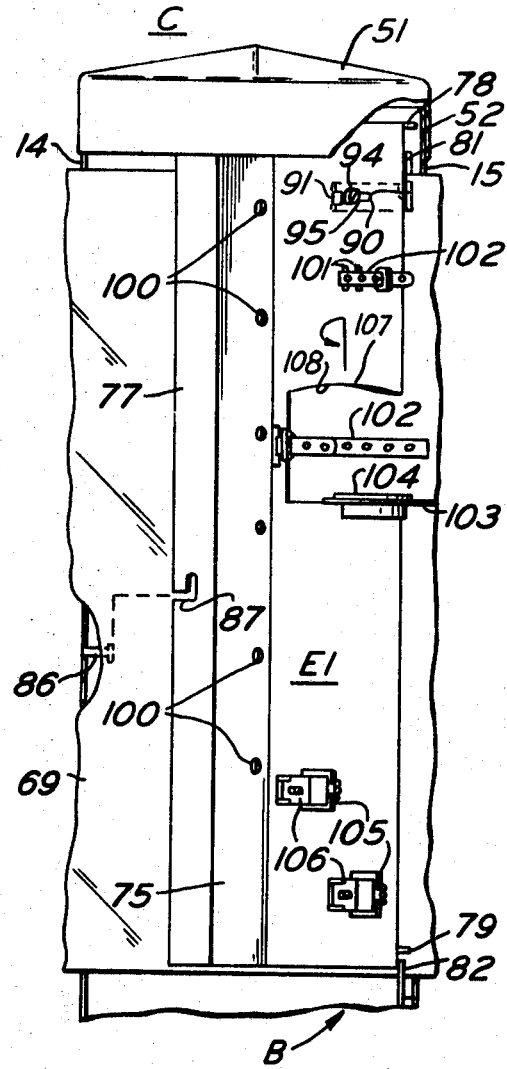
FIG. 5 is a front elevational view of the upper part of the pedestal with the retainer bar in a fully released position for removal of the component mounting plate.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to FIGS. 1 to 6 of the drawings, in the embodiment there illustrated, the vertical pedestal or terminal housing, shown generally at 10, is preferably of rectangular tubular shape and of sheet metal of suitable gauge, has a rear section A with flat vertical rear wall 12 extending the height of the pedestal 10 with vertical parallel side walls 14 and 15 extending forwardly therefrom. The rear wall 12 and side walls 14 and 15 in horizontal cross section are of channel shape.

The rear wall 12 has an outward projection or tab 16 and a bolt hole 17 thereabove for securing to an anchor post (not shown) so that only one nut and bolt is required for attachment.

A lower front section B is provided detachably mounted on the rear section A.

The lower front section B preferably includes a flat vertical lower front wall 18 having an upper terminal edge 19 and lower vertical parallel side walls 20 and 21 extending rearwardly therefrom.

The lower front wall 18 and lower side walls 20 and 21, in horizontal cross section, are preferably of channel shape and have rims 23 and 24 extending inwardly in overlapping relation to the side walls 14 and 15.

The lower front section B is detachably held in assembled relation to the rear section A in any desired manner but preferably by a plurality of stops 30 in the walls 14 and 15 and captive bolts 32 carried on the walls 20 and 21 engaged in J-shaped slots 31 in the walls 14 and 15.

The lower front wall 18 has a slot 35 extending upwardly from its lower margin for the entrance of a service wire.

The lower front wall 18 on the interior thereof has a channeled service wire or cable guard plate 37 secured thereto with side flanges 38 engageable at their lower ends with struck-in vertically upwardly extending tongues 39 formed on the lower front wall 18 and at their upper portions engageable with struck-in horizontally disposed tongues 41 formed on the lower front wall 18.

A top closure C is provided, preferably made as a rectangular inverted dish-shaped cap 51 with a downwardly extending rim 52 in overlapping relation to the top of the rear wall 12 and the upper part of side walls 14 and 15 and secured thereto as by riveting.

An upper front and side closure D is provided, preferably channel-shaped in horizontal cross section, and has a flat vertical front wall 55 and parallel vertical side walls 56 and 57 with inset rims 58 disposed inwardly along and in overlapped relation to the side walls 14 and 15.

The front wall 55 preferably extends downwardly outside the lower front wall 18 in overlapping relation thereto and the side walls 56 and 57 extend downwardly in overlapping relation to the side walls 20 and 21.

The upper closure C is detachably held in assembled relation to the rear section A and lower front section B in any desired manner but preferably by a plurality of shoulder rivets 60 on the side walls 56 and 57 and engaged in J-shaped slots or openings 61 on the walls 14 and 15 and a captive bolt 62 carried by the wall 57 and engaged in a J-shaped slot 63.

A sheet 68 of flexible dielectric material may be provided and secured to the upper portion of the pedestal 10 in the interior, and advantageously can be secured to the inner face of rear wall 12 and extending downwardly to a location spaced above the level of the upper edge 19. The sheet 68 has side wing portions 69 to extend forwardly and across the front, rearwardly of the front wall 55, in overlapping relation as at 70 and in protecting relation to components mounted in the interior. The sheet 68 is preferably of low density polyethylene.

The sheet 68 is shown in FIG. 2 in a protective position but can readily be move to an opened position for access to the interior of the upper end of the pedestal 10 for installation and connection of components and cable terminals.

A component mounting plate E1 is shown disposed intermediate the rear wall 12 and the front wall 55. The plate E1 has a front wall portion 72 with a right side edge flange 73 extending rearwardly from the front wall portion 72 and wall portions 74 and 75 providing a forwardly disposed wire channel 76 bounded by a left side edge flange 77.

The right side edge flange 73 has hinge lugs 78 and 79 for detachable engagement with hinge pins 81 and 82 carried on tabs 83 and 84 on the side wall 15. One of the hinge pins, such as the hinge pin 81 is shorter than the other to facilitate the assembly of the hinge lugs 78 and 79 on the pins 81 and 82.

In order to retain the component mounting plate E1 in position the side wall 14 has a shoulder rivet 86 carried thereby for engagement in a J-shaped slot 87 in the left side edge flange 77.

A sliding retainer bar 90 is provided slidable in a vertical slot 89 in the flange 73 and supported by the bottom edge of the slot 89. A clamping bolt 94 is provided, extending through a horizontally elongated slot 95 in the wall 72 and in threaded engagement in the retainer bar 90, the bolt 94 also providing support for the bar 90.

The retainer bar 90 has an upper edge 96 which in the extreme right position of the bar 90 is disposed under and in engagement with the tab 83 (see FIG. 3) and prevents upward and swinging movement of the component mounting plate E1.

The retainer bar 90 has a cut-out portion providing a ledge 97 which, when the retainer bar 90 is moved partly to the left (see FIG. 4), permits swing movement of the plate E1 for access to the rear for mounting components. The plate E1 cannot be removed in this position of the retainer bar.

The plate E1 has a struck-in protuberance 91 in the path of movement of the retainer bar 90 along the back or inner face of the wall 72 which limits movement of the retainer bar 90 toward the left unless and until the bolt 94 is loosened to a sufficient extent that the bar 90 can move rearwardly of the protuberance 91 (see FIG. 5) and so that the ledge 97 is clear of the tab 83. The plate E1 can then be raised so that the hinge lugs 78 and 79 are clear of the hinge pins 81 and 82 and removed.

The clamping bolt 94 can be restricted in its operation to persons equipped with a special wrench and for this purpose a socket 98 can be provided in the head of the bolt 94 of selected shape.

The component mounting plate E1 can have any desired devices or components connected to it.

For example, the wall portion 75 can have openings 100 for the attachment of components, the wall 72 can have openings 101 for attachment of straps or cable ties 102, a forwardly extending bracket 103 can have a protective socket 104 for the cable, and forwardly extending tongues 105 for the attachment of ground clamps 106 can be provided. The tongues 105 are angularly disposed at other than right angles so that when the plate E1 is in its secured position, ready access with a screw driver or socket wrench can be had.

The front wall portion 72 above the bracket 103 is preferably concaved as at 107 to permit a cable (not shown) disposed rearwardly of the plate E1 to be drawn upwardly without being injured by the lower margin 108.

Figure 7:
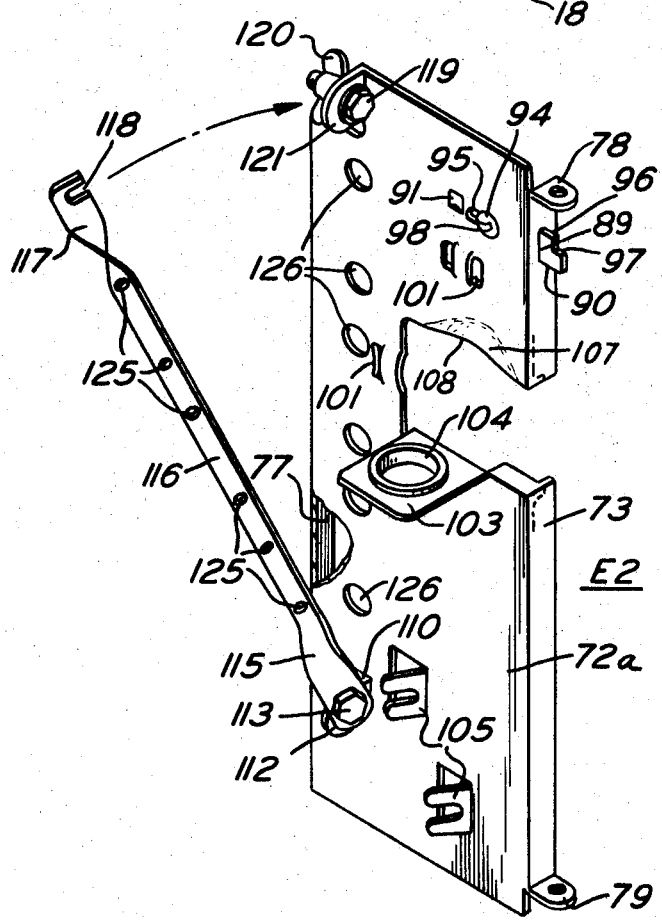
FIG. 7 is a view in perspective of a different form of component mounting plate.

Referring now to FIG. 7, another preferred form of component mounting plate E2 is there shown which has a front wall 72a, side edge flanges 73 and 77, hinge lugs 78 and 79 as before and a retainer bar 90 and clamping bolt 94 as previously described.

The plate E2 can have a supporting clip 110 formed thereon. The clip 110 has a vertical forwardly extending portion 112 for the reception of a horizontal bolt 113 with nut (not shown) thereon which provides a hinge pin or fulcrum for the lower end 115 of a bracket 116. The bracket 116 extends from the lower end 115 in a vertical plane perpendicular to the vertical plane of the lower end 115. The bracket 116 has an upper end 117 in a vertical plane parallel to the plane of the lower end 115. The upper end 117 of the bracket 116 has a rearwardly extending slot 118 for engagement of the upper end 117 on a captivated bolt 119. The captivated bolt 119 has a wing nut 120 thereon for manual manipulation for holding the bracket 116 in its upright position and held against separation from the bolt 119 in any desired manner.

The bolt 119 is carried on the forwardly extending portion 121 of an upper mounting clip formed on the plate 72a.

The bracket 116 is an elongated strip, preferably of metal, but may be of synthetic plastic material of adequate strength.

The bracket 116 is illustrated in FIG. 7 as having a plurality of openings 125 for the attachment of components. The plate E2 at locations in axial alignment with the bracket openings 125 has enlarged openings 126 so that fastening devices, such as bolts, (not shown) in the openings 125 will have adequate clearance and thus not engage the plate E2 and effect undesired grounding.

Figure 8:
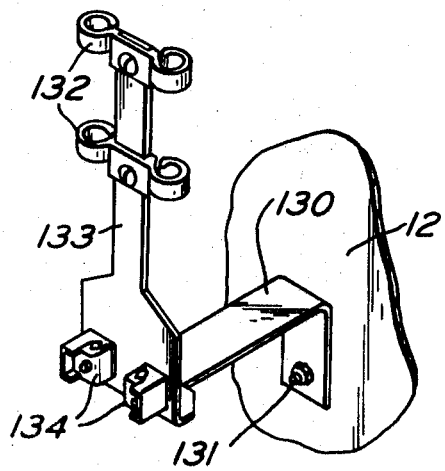
FIG. 8 shows a modified form of internal supporting structure which can be used in lieu of a component mounting plate.
Figure 6:
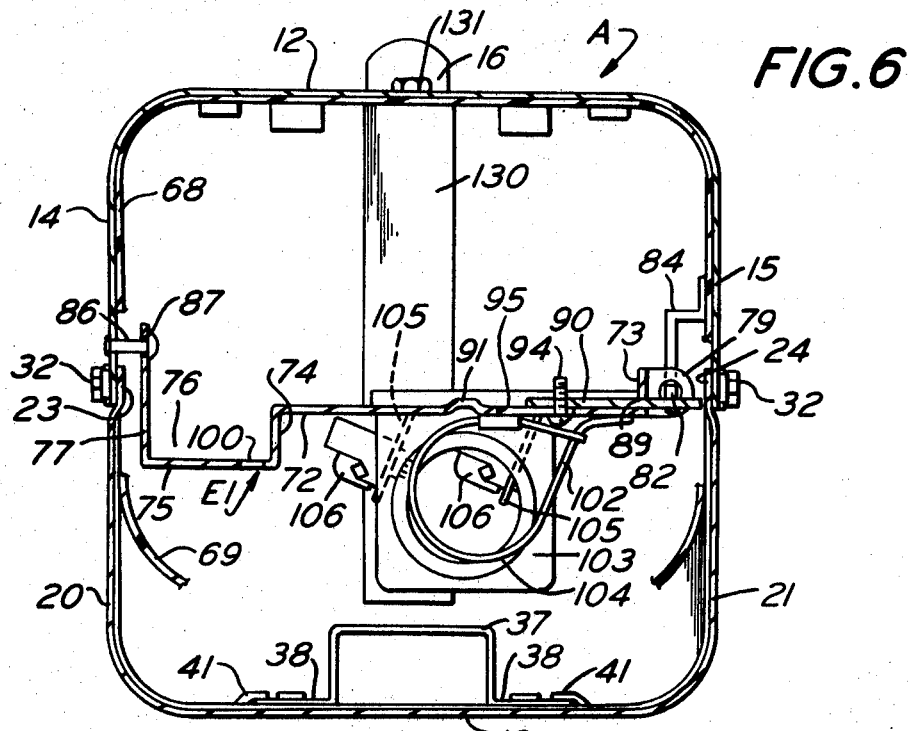
FIG. 6 is a horizontal sectional view, enlarged, taken approximately on the line 6—6 of FIG. 3.

Referring now to FIG. 8 the pedestal 10 is shown for installations in which the component mounting plates E1 and E2 are not desired. A bracket 130 secured to the rear wall 12 by a bolt 131 carries wire holders 132 on a post 133 with grounding clamps 134 secured thereto.

The pedestal 10 as herein disclosed is particularly suited for receiving the terminal ends of cables (not shown) which extend upwardly from the bottom for the interconnection into the circuitry of loading coils, terminal blocks both protected and unprotected and other instrumentation including built-out capacitors, lattice networks, saturable inductors, junction impedance compensators, gas tube protectors and others.

The cable ties and cable tie supports can be utilized for the cables while the retainer clips and the plates E1 or E2 can be utilized for mounting of the desired components. Access to the rear of plates E1 and E2 for attachment of components can be readily effected.

The upper front closure D can be removed if desired by loosening the bolt 62, moving the closure D upwardly and then forwardly as permitted by the J-shaped slots 61 and 63. The lower front section can be similarly removed either before or after separation of the cable guard plate 37.

The removability of the cable guard plate 37 and the component mounting plates E1 and E2 permits of replacement of a damaged pedestal 10 without disconnection of the components and connected cable ends.

I claim:

1. A terminal housing for electrical equipment comprising
    a housing means having a vertically elongated rear wall and side walls extending forwardly therefrom,
    a cap at the top of said housing means,
    a detachable closure means for the upper front and side portions of said housing means and having a vertically elongated front wall extending downwardly from said cap with side walls extending therefrom in overlapping relation to the first mentioned side walls, and
    a detachable closure means for the lower front and side portions of said housing means,
    said second-mentioned detachable closure means having a cable entry guard detachably connected on the interior thereof for release therefrom.

2. A terminal housing as defined in claim 1 in which said second-mentioned detachable closure means has a lower marginal edge and a slot open at its lower end and extending to said edge.

3. A terminal housing as defined in claim 1 in which said cable guard has a vertical channel and side flanges, and
    said second-mentioned closure means has holding members with which said side flanges are in slidable engagement.

4. A terminal housing for electrical equipment comprising
    a housing means having a vertically elongated rear wall and side walls extending forwardly therefrom,
    a cap at the top of said housing means,
    a detachable closure means for the upper front and side portions of said housing means and having a vertically elongated front wall extending downwardly from said cap with side walls extending therefrom in overlapping relation to the first mentioned side walls,
    a detachable closure means for the lower front and side portions of said housing means, and
    a component mounting plate in the upper part of said housing portion, and
    vertical hinge members hingedly supporting one side of said mounting plate with respect to one of said side walls.

5. A terminal housing as defined in claim 4 in which
    a locking member is provided on said plate and having portions engageable therewith and movable,
    to a position to retain said plate in a closed position,
    to a position for swinging movement of said plate but preventing removal of said plate from said hinge members, and
    to a position for permitting removal of said plate from said hinge members.

6. A terminal housing as defined in claim 4 in which said plate at the side opposite to said hinge members has members for limiting swinging of said plate on said hinge members.

7. A terminal housing as defined in claim 6 in which a locking member is carried on said plate with a portion for preventing removal of said plate from said hinge members.

8. A terminal housing as defined in claim 7 in which said locking member has an adjustable threaded member for controlling the positioning thereof, and
    a stop is provided for limiting the movement of said locking member for one condition of adjustment of said threaded member.

9. A terminal housing as defined in claim 7 in which said locking member has a plurality of surface portions for engagement with a fixed portion on said housing.

10. A terminal housing as defined in claim 9 in which one of said surface portions is effective for preventing vertical displacement of said mounting plate.

11. A terminal housing as defined in claim 10 in which
another of said surface portions is effective for permitting limited swinging movement of said plate.
12. A terminal housing as defined in claim 9 in which
said locking member is movable to a released position permitting removal of said plate from its hinged support.
13. A terminal housing as defined in claim 4 in which
a locking member is carried on said plate with a portion for preventing removal of said plate from said hinge members.
14. A terminal housing as defined in claim 4 in which said mounting plate has a channel along one margin thereof.
15. A terminal housing as defined in claim 4 in which
said mounting plate has a bracket pivotally mounted thereon.
16. A terminal housing as defined in claim 4 in which
said mounting plate has a front wall portion with a plurality of openings for component mounting.
17. A terminal housing as defined in claim 4 in which
said mounting plate has extending forwardly therefrom a plurality of mounting fingers, and
said fingers are inclined to facilitate access thereto.

* * * * *